United States Patent
Hochstein

(10) Patent No.: US 8,965,825 B2
(45) Date of Patent: Feb. 24, 2015

(54) MODE DETERMINATION FOR MULTIVARIATE TIME SERIES DATA

(71) Applicant: International Business Machines Corporation, Armonk, NY (US)

(72) Inventor: Axel Hochstein, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 13/675,224

(22) Filed: Nov. 13, 2012

(65) Prior Publication Data

US 2014/0136461 A1    May 15, 2014

(51) Int. Cl.
   *G06N 5/00* (2006.01)
   *G06N 5/02* (2006.01)

(52) U.S. Cl.
   CPC ........................................ *G06N 5/02* (2013.01)
   USPC .......................................................... 706/46

(58) Field of Classification Search
   CPC ....................................................... G06N 5/02
   USPC .......................................................... 706/46
   See application file for complete search history.

(56) References Cited

U.S. PATENT DOCUMENTS

2007/0010998 A1    1/2007   Radhakrishnan et al.

OTHER PUBLICATIONS

Kyriazis et al ("Bayesian recursive estimation of linear dynamic system states from measurement information" Mar. 2012).*

Hochstein et al ("Optimal Control of HVAC Operations Based on Sensor Data" Jul. 2012).*

IP.com, online; retrieved on Jun. 21, 2012; retrieved from Internet http://priorartdatabase.com/IPCOM/000195181. Anonymous., "Using Multiple Predictions and Standard Statistical Measures to Reduce False Positives During Real-time, Time Series Analysis of Metrics Which Measure Operating System Behavior," IP.com Prior Art Database, Apr. 22, 2012.

Ghahramani, et al., "Variational Learning for Switching State-Space Models," Neural Computation 12 (4), pp. 831-864, 2000.

IP.com, online; retrieved on Jun. 21, 2012; retrieved from Internet http://www.ip.com/pubview/IPCOM000154702D. IBM., "Time Series Analysis—Semi-automated Selection of Arima Model Type and Parameters," IP.com Prior Art Database; Jul. 12, 2007.

Mesot, et al., "Switching Linear Dynamical Systems for Noise Robust Speech Recognition," IEEE Transactions on Audio, Speech, and Language Processing, vol. 15, No. 6, pp. 1850-1858, Aug. 2007.

(Continued)

*Primary Examiner* — Lut Wong
(74) *Attorney, Agent, or Firm* — Cantor Colburn LLP

(57) ABSTRACT

Embodiments relate to mode determination for multivariate time series data. An aspect includes determining first within-mode and first cross-mode parameters for a first number of modes, each mode comprising one or more time periods in the multivariate time series. Another aspect includes determining a first likelihood of the at least one multivariate time series based on the first sets of within-mode parameters and first set of cross-mode parameters. Another aspect includes determining second within-mode and second cross-mode parameters for a second number of modes. Another aspect includes determining a second likelihood of the at least one multivariate time series based on the second sets of within-mode parameters and second set of cross-mode parameters. Another aspect includes based on the first likelihood being higher than the second likelihood, selecting the first number of modes to model the at least one multivariate time series.

11 Claims, 15 Drawing Sheets

(56) References Cited

OTHER PUBLICATIONS

IP.com, online; retrieved on Jun. 21, 2012; retrieved from Internet http://www.ip.com/pubview/IPCOM000185473D. Mignet, et al., "Method to Predict Future Shape of a Time Series Within a Fixed Window Using Non-local Information to a Specified Level of Accuracy," IP.com Prior Art Database; Jul. 27, 2009.

IP.com, online; retrieved on Jun. 21, 2012; retrieved from Internet http://www.ip.com/pubview/IPCOM/000101021. Nadas, et al., "Canonical Time Series Modeling by Neural Network Functions," IP.com Prior Art Database, Mar. 16, 2005.

Oh, et al., "Learning and Inferring Motion Patterns Using Parametric Segmental Switching Linear Dynamic Systems," International Journal of Computer Vision, vol. 77, Issue 1-3, pp. 103-124, May 2008.

* cited by examiner

MODE DETERMINATION FOR MULTIVARIATE TIME SERIES DATA

BACKGROUND

The present disclosure relates generally to using probabilistic event networks to predict future events, and more specifically, to mode determination for multivariate time series data.

Increasing digitization of enterprise internal operations as well as external environments implies an availability of information about a large amount of ordinary events that occur within and around an enterprise. For example, systems for enterprise resource planning (ERP), supply chain management (SCM), or customer relationship management (CRM) record many of the events related to the corresponding management areas. Also, various types of sensors provide information about events related to physical assets. Given a stream of primitive data about ordinary events, actionable information may be extracted to allow reasoning and decision-making in real-time. Such sensor data often is in the form of one or more multivariate time series. Multivariate time series are typically generated from similar types of sensor networks, for example, multiple pieces of similar types of equipment, each instrumented with the same type and set of sensors.

BRIEF SUMMARY

Embodiments include a system for mode determination for multivariate time series data. An aspect includes receiving at least one multivariate time series comprising historical data. Another aspect includes determining a first number of modes for the at least one multivariate time series, each mode comprising one or more time periods in the multivariate time series. Another aspect includes for each mode of the first number of modes, determining a first respective set of within-mode parameters that describe behavior of the at least one multivariate time series during the one or more time periods corresponding to the mode. Another aspect includes determining a first set of cross-mode parameters for the first number of modes that describe behavior of the at least one multivariate time series across the first number of modes. Another aspect includes determining a first likelihood of the at least one multivariate time series based on the first sets of within-mode parameters and first set of cross-mode parameters. Another aspect includes determining a second number of modes for the at least one multivariate time series. Another aspect includes for each mode of the second number of modes, determining a second respective set of within-mode parameters that describe behavior of the at least one multivariate time series during the one or more time periods corresponding to the mode. Another aspect includes determining a second set of cross-mode parameters for the second number of modes that describe behavior of the at least one multivariate time series across the second number of modes. Another aspect includes determining a second likelihood of the at least one multivariate time series based on the second sets of within-mode parameters and second set of cross-mode parameters. Another aspect includes based on the first likelihood being higher than the second likelihood, selecting the first number of modes to model the at least one multivariate time series.

Further embodiments include a system for parameter determination for multivariate time series data. An aspect includes determining a set of cross-mode parameters for a first number of modes that describe behavior of at least one multivariate time series across respective time periods corresponding to the first number of modes, wherein the set of cross-mode parameters are determined based on a probabilistic event network, and further based on evidence and weight sets that are determined by Kalman filtering. Another aspect includes determining a likelihood of the at least one multivariate time series based on sets of within-mode parameters corresponding to the first number of modes and the set of cross-mode parameters. Yet another aspect includes based on the likelihood being lower than a likelihood for a second number of modes, the second number of modes being equal to the first number of modes minus 1, outputting sets of within-mode parameters and a set of cross-mode parameters corresponding to the second number of modes.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Embodiments described herein are directed to mode determination for multivariate time series data. A multivariate time series generally exhibits heterogeneous behavior, as model parameters change over time. Therefore fitting one model (i.e. one set of parameters) over the entire multivariate time series leads to averaging over sections with differing behavior, leading to information loss and specific variable relationships within certain time periods that might not be represented in the averaged model. Therefore, to describe multivariate time series, a plurality of modes are determined, each mode including a section of the multivariate time series that exhibits particular, distinct behavior. The number of modes that are appropriate for particular multivariate time series, and the parameters that describe the behavior of the multivariate time series both within and between modes, are determined by an iterative process based on probabilistic event network learning for between modes dependencies, and dynamic model learning for dependencies within individual modes. In some embodiments, the dynamic model learning is based on linear dynamic system (LDS) learning. Determination of the appropriate number of modes, and the parameters that describe behavior across the modes, allows prediction of future events using multivariate time series data.

Figure 1:
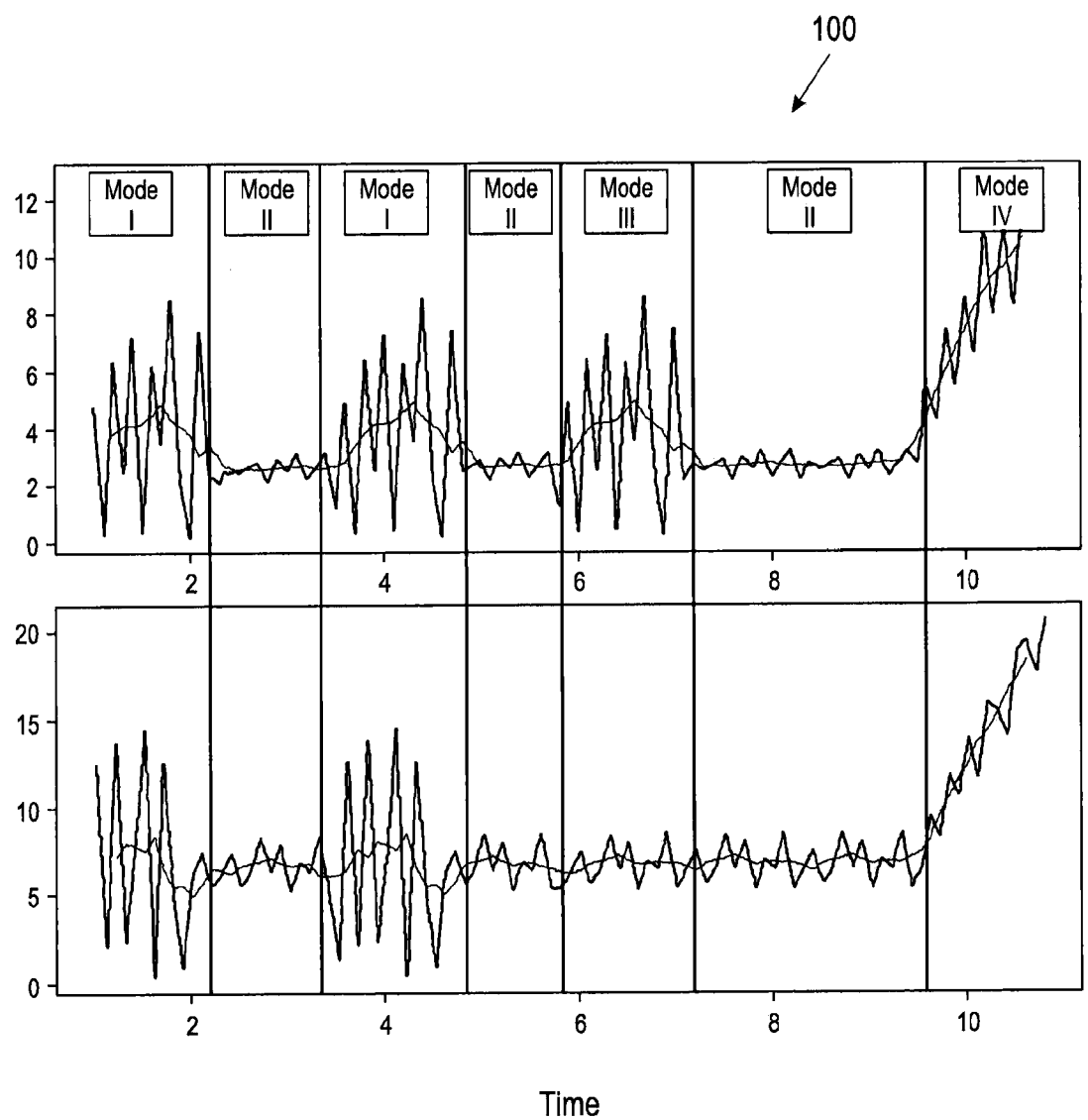
FIG. 1 depicts a multivariate time series and a plurality of modes in accordance with an embodiment.
Figure 2A:
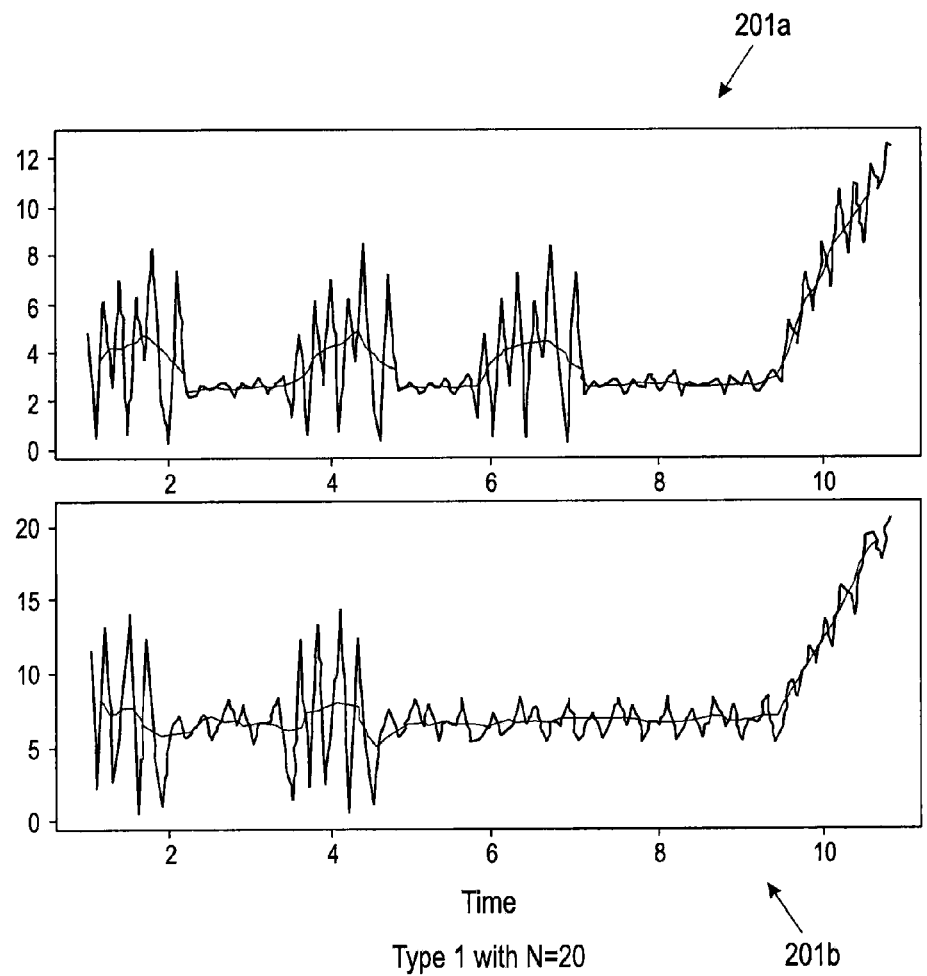
FIGS. 2A-F depict a plurality of types of multivariate time series in accordance with an embodiment.
Figure 2B:
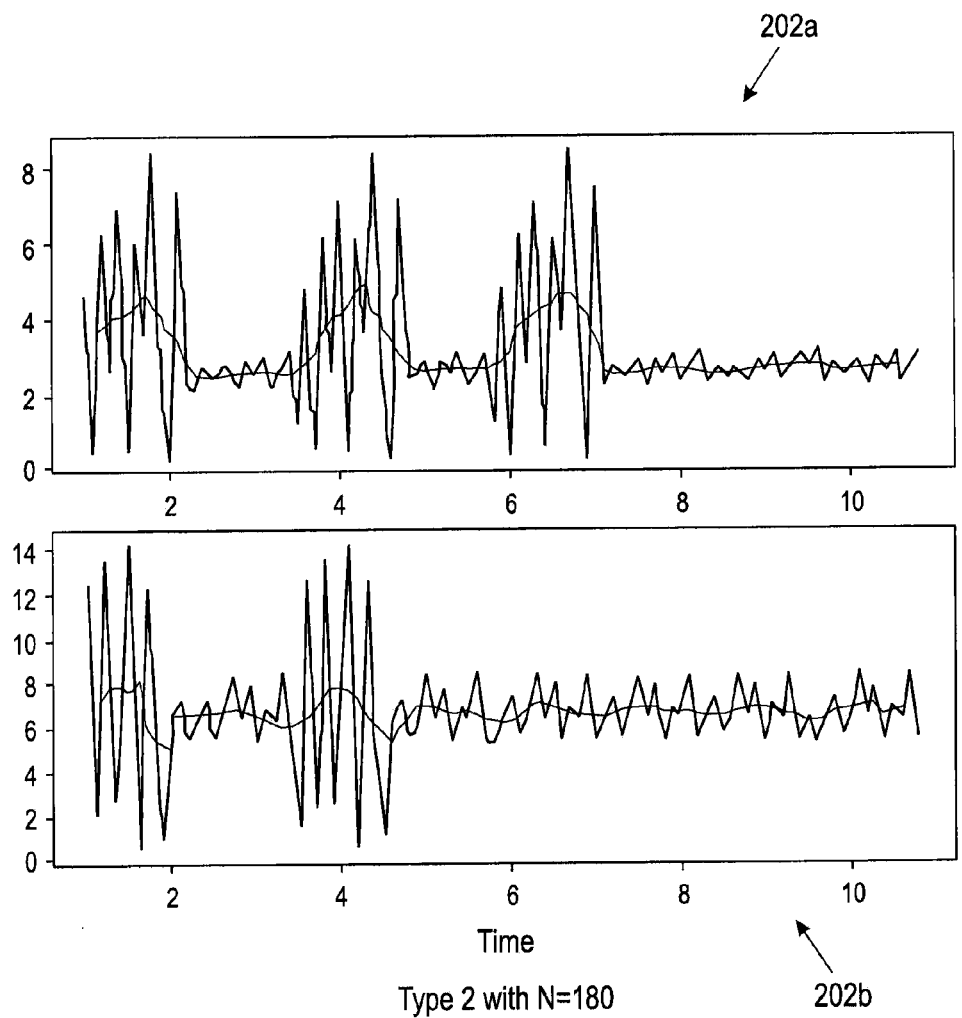
Figure 2C:
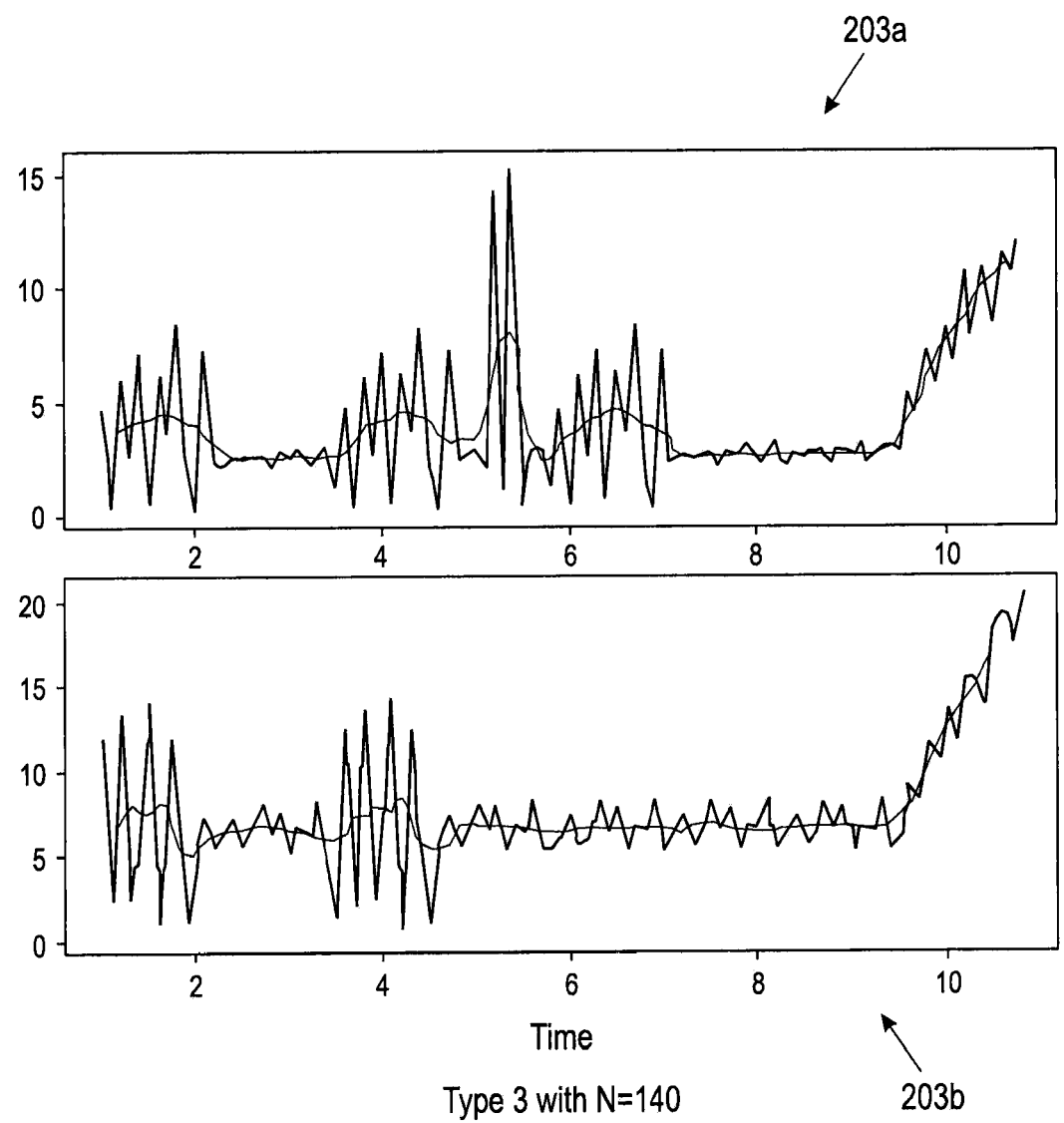
Figure 2D:
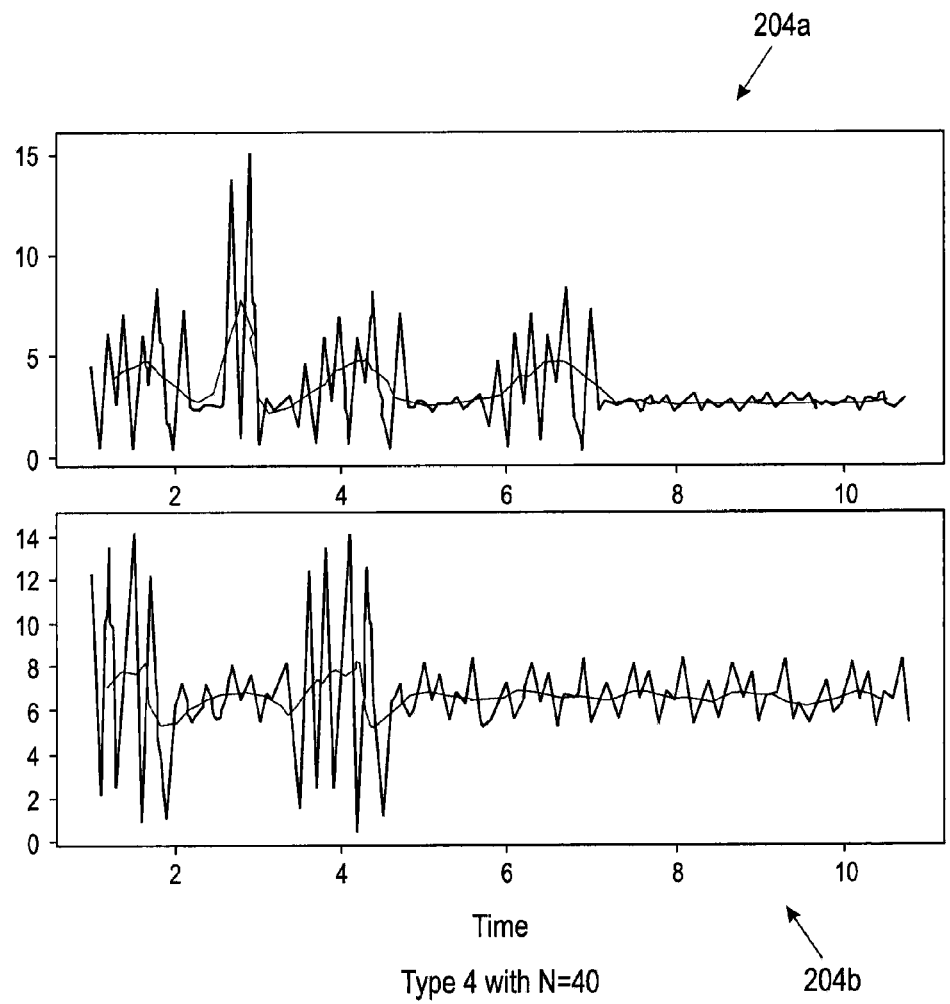
Figure 2E:
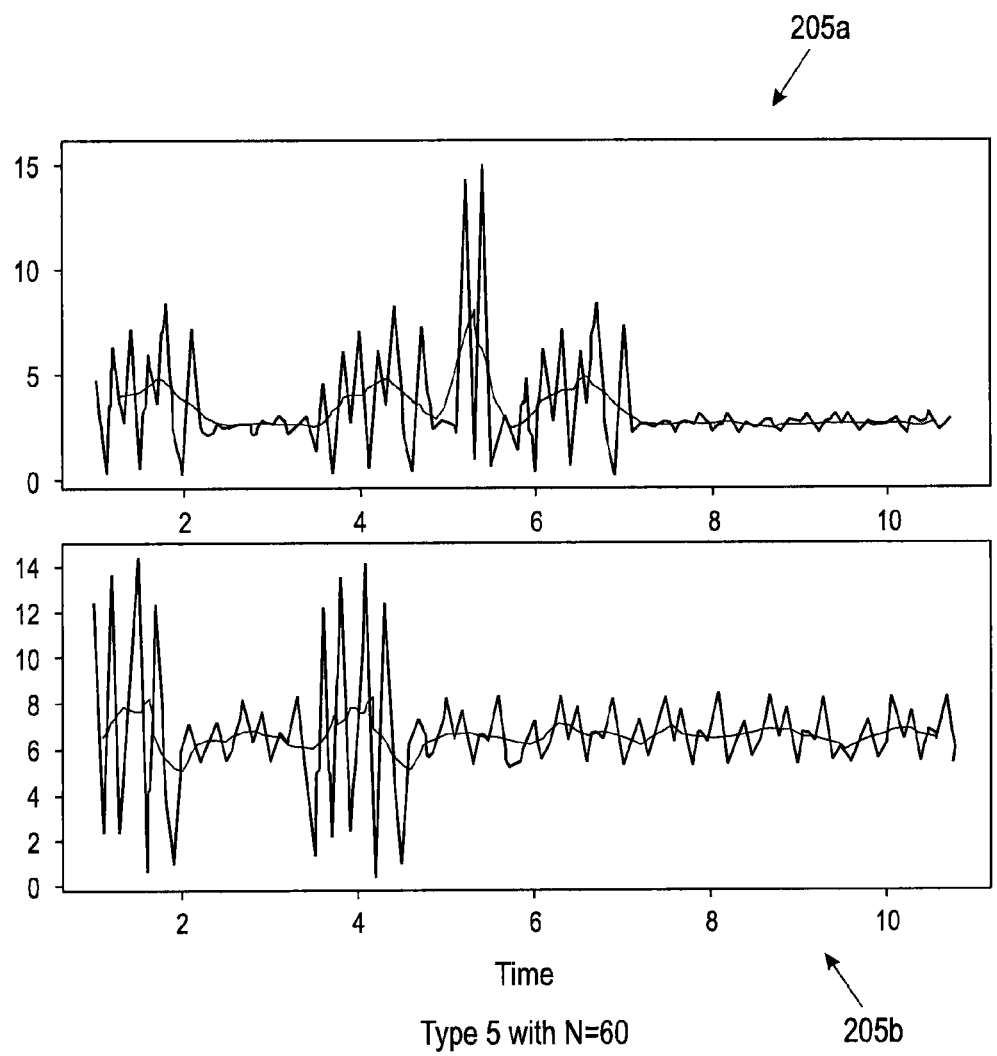
Figure 2F:
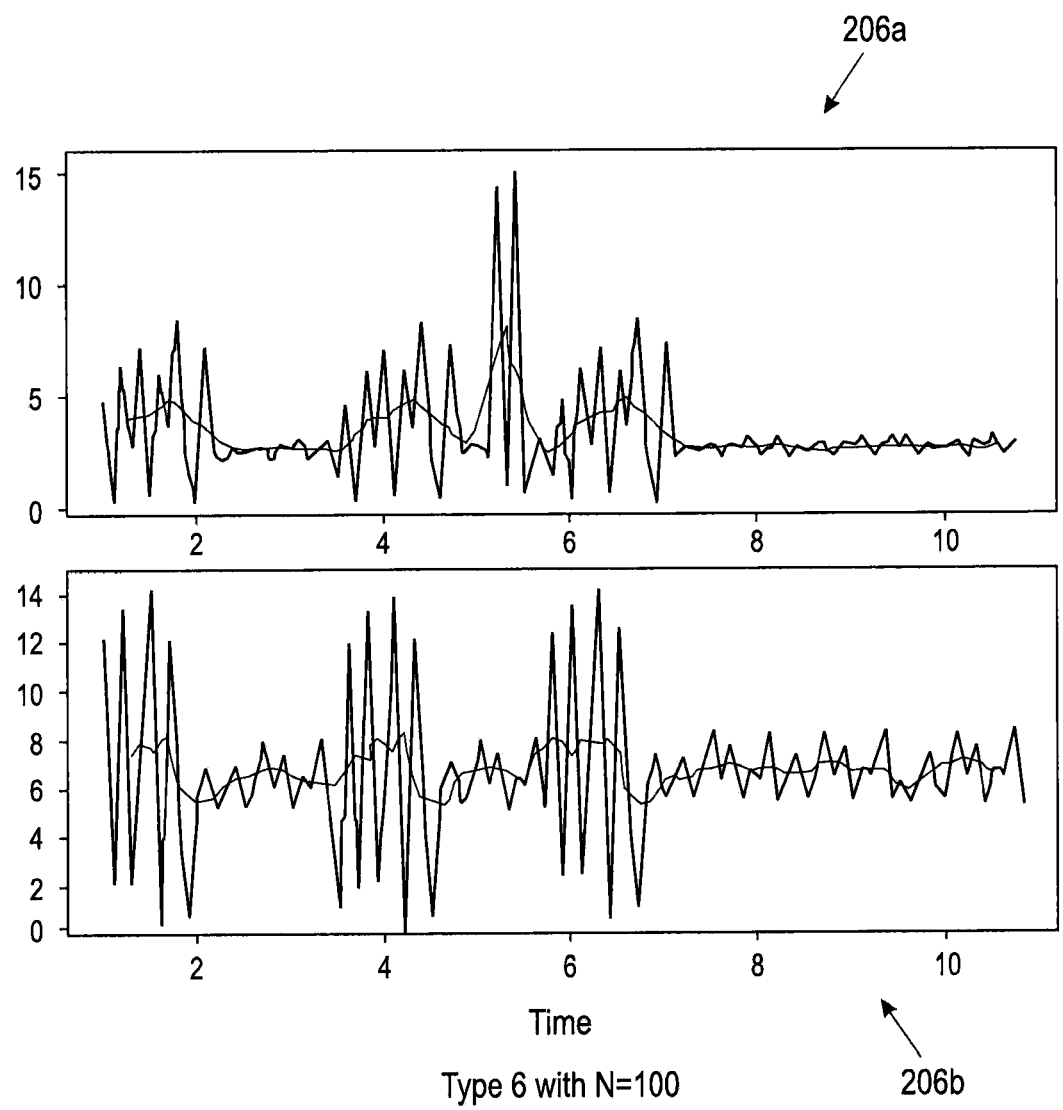

Turning now to FIG. 1, an example multivariate time series 100 in accordance with an embodiment is generally shown. Multivariate time series 100 of FIG. 1 is divided into 4 modes, mode I to mode IV. Each of modes I-IV exhibits different behavior. As shown in FIG. 1, after a period of extreme conditions in mode III, the conditions may return back to normal for a period of time in mode II, which occurs after mode III. However, the occurrence of mode III leads to the occurrence of further extreme conditions in the future during mode IV. In some embodiments, the sensors that generate multivariate time series 100 are, for example, vibration or temperature sensors that monitor a physical asset, such as a vehicle or a machine that is part of a manufacturing process. For example, the extreme conditions that occur in mode III of FIG. 1 may include a vibration or overheating condition that creates a crack that is not directly observable in the physical asset. After mode III is over, the behavior of the sensor data goes back to normal in mode II for a period of time; however, the crack that was created in mode III may grow during mode II. Further extreme conditions later occur in mode IV as a result of the crack that was created during mode III.

Based on differing sequences and durations of modes a set of multivariate time series is divided in multiple types as illustrated in FIGS. 2A-F. FIGS. 2A-F illustrate a plurality of examples of types of multivariate time series 201a-b, 202a-b, 203a-b, 204a-b, 205a-b, and 206a-b, each comprising a different sequence of modes. Each of the multivariate time series 201a-b, 202a-b, 203a-b, 204a-b, 205a-b, and 206a-b of FIGS. 2A-F fit into a corresponding type 1 through type 6, and the various types each have a different weight N, indicating the observed number of instances of each particular type. In some embodiments, in each of the multivariate time series, such as multivariate time series 201a-b, the top graph 201a corresponds to a first sensor on a physical asset, and the bottom graph 201b corresponds to a second sensor on the same physical asset. The various weights N assigned to types 1-6 are used to determine a probability that a first mode comprising a first behavior will at some point lead to a second mode comprising a second behavior. Identification of the various types of multivariate time series and their respective weights N may therefore be used to predict the likelihood of future events.

A dynamic model may be used to model multivariate time series. A LDS model is a type of dynamic model that is often used for modeling multivariate time series as state space models with a state equation:

$$x_t \sim N(Ax_{t-1};Q) \quad (EQ.1),$$

and an observation equation:

$$y_t \sim N(Hx_t;R) \quad (EQ.2).$$

In FIGS. 1 and 2 the state values that are given by the LDS parameters are represented by the smoothed lines (see, for example, line 101 in FIG. 1) whereas the jagged lines (see, for example, line 102 in FIG. 1) are the actual observed values. The LDS is indexed by the mode $Z_t$ at time t, resulting in:

$$x_t \sim N(A^{z_t}x_{t-1};Q^{z_t}) \quad (EQ.3), \text{ and}$$

$$y_t \sim N(H^{z_t}x_t;R^{z_t}) \quad (EQ.4).$$

Changing modes may be represented by using a first-order Markov process $$z_t \sim P(Z|z_{t-1}) \quad (EQ.5),$$

where the transition distribution reflects the probabilities of moving from one mode to one of the other modes in a subsequent time step.

Multivariate time series may contain delayed effects, that is, variable relationships stretching across several non-contiguous modes. However, first-order Markov processes as described by EQ. 5 calculate transition probabilities only based on subsequent time steps, and thereby capture only dependencies across two time steps. For example, in an environment with a measuring frequency of one per second, effects stretching over two seconds may be captured. Long term predictions are then calculated by forward propagating two second windows for each mode based on the current state. Therefore, if there is an effect that stretches over more than two seconds, that effect will not be discovered with such models.

In order to be able to discover such long term dependencies within dynamic model frameworks, probabilistic event networks are used instead of first-order Markov processes. Probabilistic event networks (which are described in further detail in U.S. application Ser. No. 13/351,423, to Hochstein et al., filed on Jan. 17, 2012, which is herein incorporated by reference in its entirety) define relations between event occurrences, relations between context variables, and relations between event occurrences and context variables. Time is defined as a context variable, and therefore relations between variables across several time slices are represented in a compact way. For each event type in an event set, a binary variable Ψ is defined that may be either true or false, representing the occurrence of an event of that type. Given the binary variable Ψ for an event type, a set of context variables for the event type are also defined, specifying facts about the state in which the event type occurs. In general it can be differentiated between the set of specific context variables, where the assignment is null in case of Ψ=false, and the set of generic context variables, where in case of Ψ=false the assignment is unknown and needs to be sampled from a known distribution. The context variables may represent the time of occurrence of the event.

In order to determine the number of modes Z that best fits a particular set of multivariate time series, various sets of parameters are determined. The first sets of parameters each describe behavior of the set of multivariate time series within a respective mode of the plurality of modes (referred to hereafter as within-mode parameters, or $\Theta_{LDS}(Z)$, for each mode Z), and the second set of parameters describes relationships across the various modes (referred to hereafter as cross-mode parameters, or $\Theta_P$). The within-mode parameter may comprise LDS parameters in some embodiments. The number of modes Z is first initialized to 1, and iteratively increased by one. For each iteration, the within-mode and cross-mode parameters for the current number of modes Z is determined, and the log-likelihood that the determined within-mode and cross-mode parameters determined for the number of modes Z accurately model, or fit, the behavior of the multivariate time series is determined. This likelihood indicates how likely it is that the given multivariate time series will be generated given particular sets of parameters. The parameters are determined using an alternating learning procedure, which may comprise Kalman filtering based forward and backward propagating. The iterations continue for subsequent values of Z until the log-likelihood of an iteration is lower than the log-likelihood of the previous iteration, at which point the number of modes Z and parameters for the previous iteration are returned. The number of modes Z, and the related parameters, that have the highest log-likelihood of describing the behavior of the multivariate time series are thereby determined.

Figure 3:
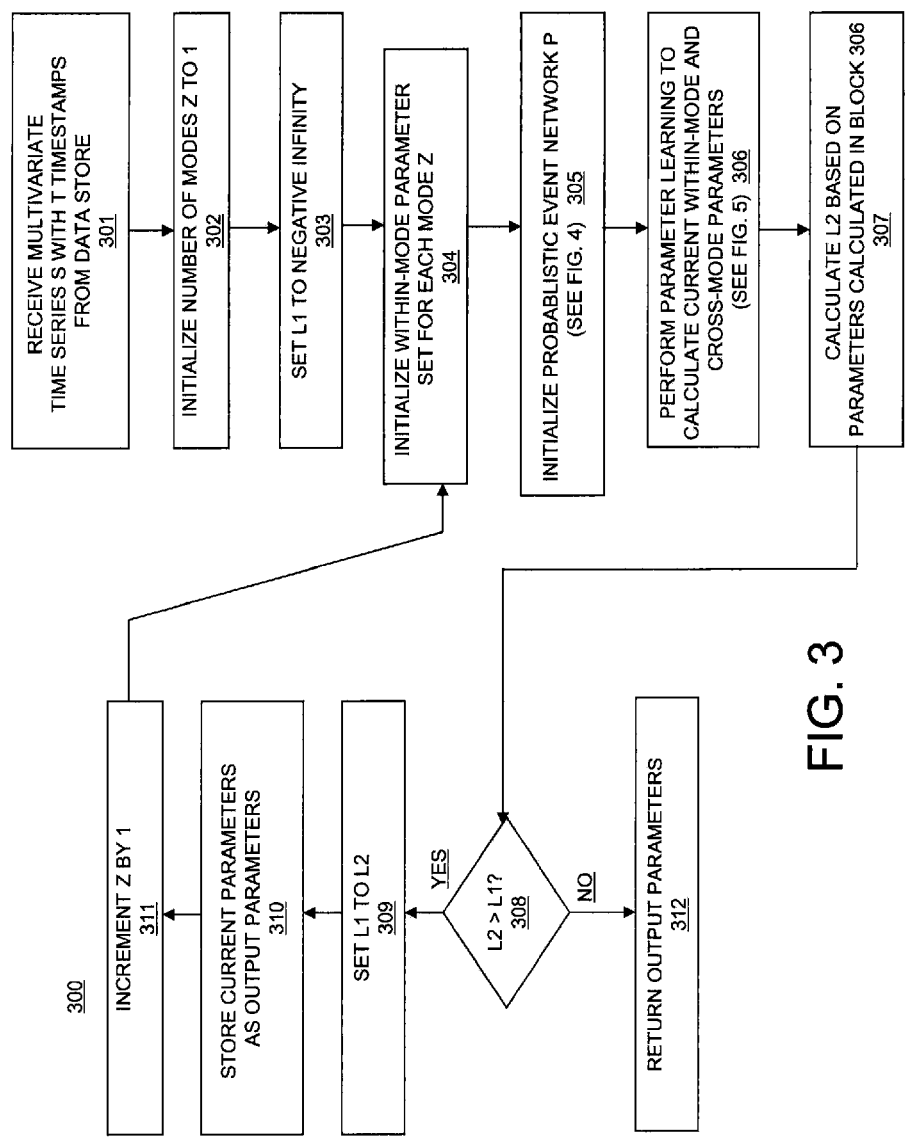
FIG. 3 depicts a process flow for mode determination for multivariate time series data in accordance with an embodiment.

Turning now to FIG. 3, a process flow of a method 300 for mode determination for multivariate time series data in accordance with an embodiment is generally shown. First, in block 301 of method 300, a set of multivariate time series S are received. The multivariate time series data S that is received in block 301 of FIG. 3 comprises sensor data in some embodiments, such as vibration or temperature sensor data from a physical asset. Next, in block 302, the current number of modes Z is initialized to 1. Then, in block 303, the current log-likelihood L1 is initialized to negative infinity. Flow then proceeds to block 304, in which a current within-mode parameter set for each mode Z is initialized; this may be performed in any appropriate manner. Next, in block 305 of method 300, the probabilistic event network P for the current number of modes Z is initialized; this is discussed in further detail below with respect to FIG. 4. Then, in block 306, parameter learning is performed to determine the current within-mode and cross-mode parameters for the current number of modes Z using the probabilistic event network P, which is discussed in further detail below with respect to FIG. 5. Parameter learning as is performed in block 306 generates a set of within-mode parameters for each of the current number of modes Z that explain the observed values in the set of multivariate time series, and a set of cross-mode parameters that explain behavior across the different modes, with a log-likelihood L2, which is calculated in block 307.

Flow then proceeds to block 308, in which it is determined whether L2, that was determined in block 307, is less than L1. L1 gives the likelihood that the set of multivariate time series S are accurately described by (i.e., will be generated by) a previous set of parameters from a previous iteration of method 300, and L2 gives the likelihood that the set of multivariate time series S are accurately described by (i.e., will be generated by) the current set of parameters. If L2 is not less than L1, flow proceeds to block 309, in which L1 is set equal to L2. Then, in block 310, the current set of cross-mode and within-mode parameters that were calculated in block 306 are stored as an output parameter set. Then, the number of modes Z is increased by 1, and flow proceeds from block 311 back to block 304. Blocks 304 to 307, and 308 to 311, are repeated for subsequent numbers of modes Z until it is determined in block 308 that L2 is less than L1, at which point flow proceeds from block 308 to block 312, and the output parameter set, include all cross-mode and within-mode parameters that were stored in the previous iteration of block 310, is returned. The output parameter set describes the set of input multivariate time series S with the highest log-likelihood.

Figure 4:
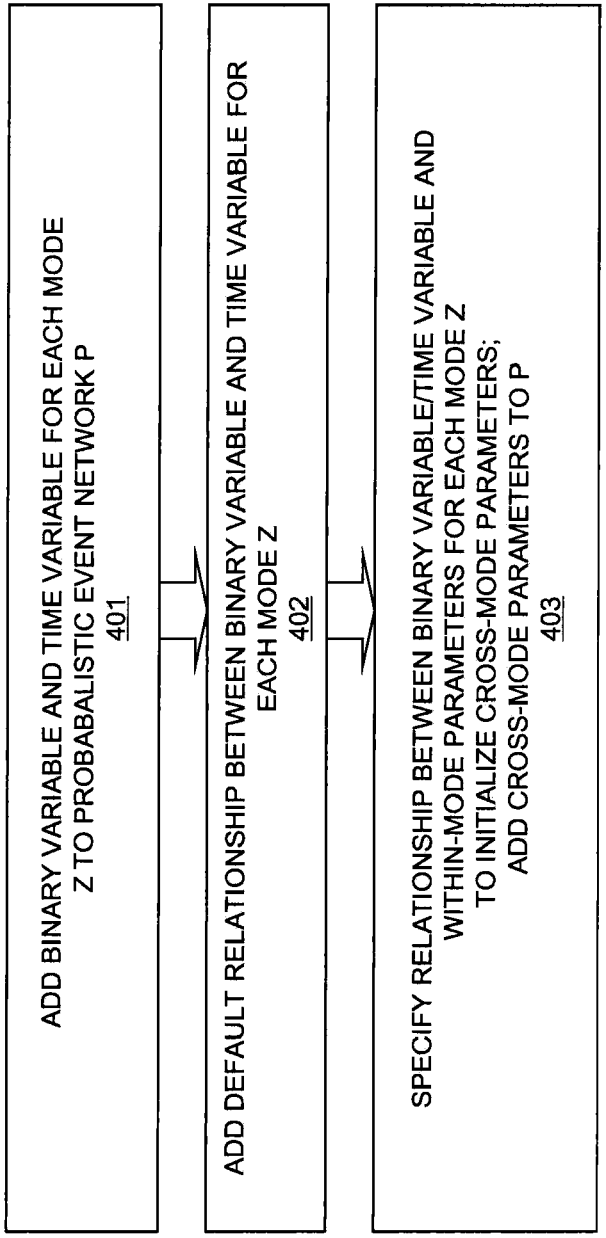
FIG. 4 depicts a process flow for initializing a probabilistic event network in accordance with an embodiment.

Referring to FIG. 4, a process flow of a method 400 for initializing a probabilistic event network P in accordance with an embodiment is generally shown. Method 400 is performed in block 305 of method 300 of FIG. 3. First, in block 401, a binary variable, which comprises one of true and false, and a related context variable comprising a time variable is added to each mode Z. Then, in block 402, a default relationship is defined between the binary variable and the time variable for each mode Z. Lastly, in block 403, a relationship between the binary variable/time variable and the within-mode parameters is specified for each mode Z to initialize the cross-mode parameters, and the initialized cross-mode parameters are added to P.

Figure 5:
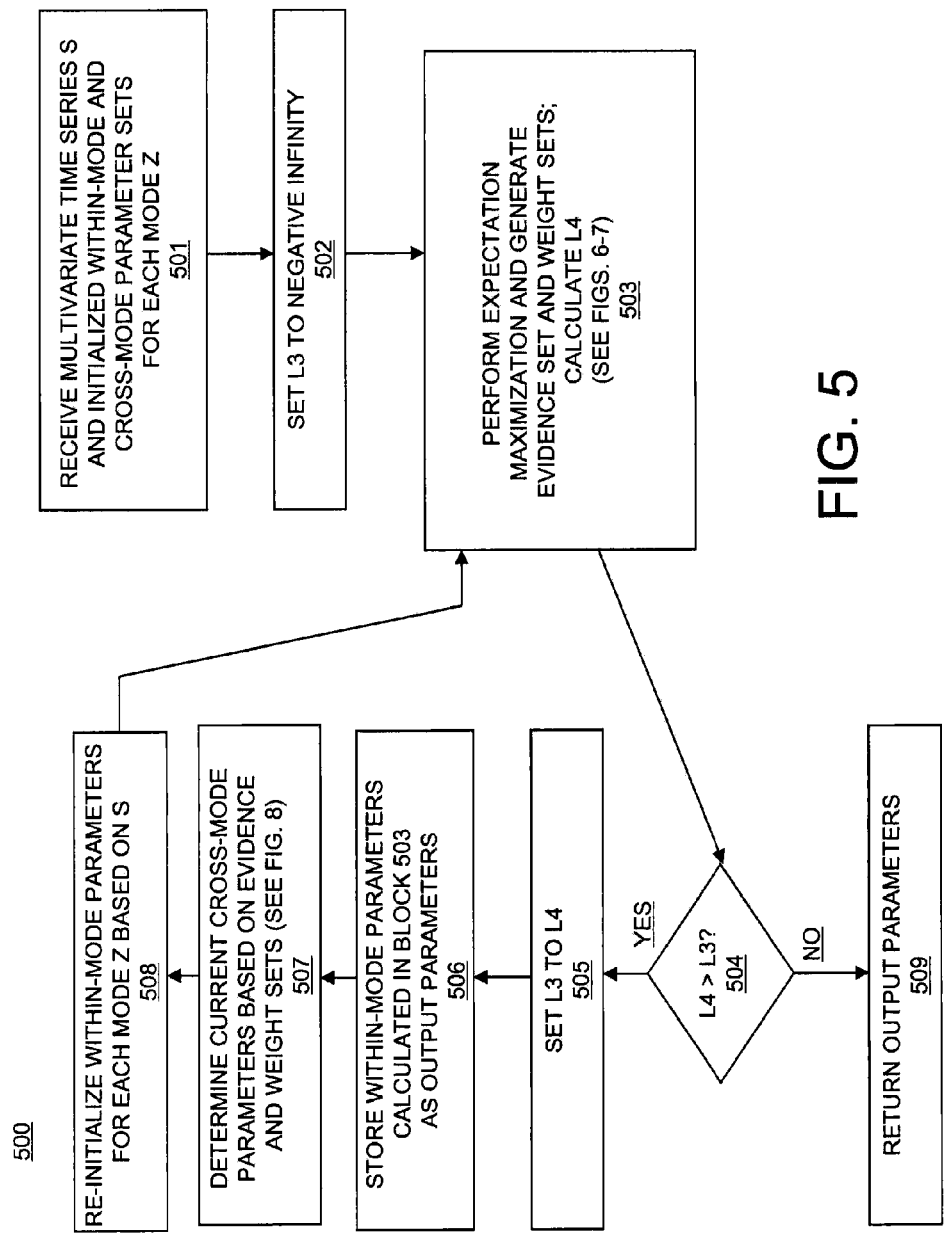
FIG. 5 depicts a process flow for parameter learning in accordance with an embodiment.

Turning now to FIG. 5, a process flow of a method 500 for parameter learning in accordance with an embodiment is generally shown. Method 500 is performed in block 306 of method 300 of FIG. 3. First, in block 501, the set of multivariate time series S, current cross-mode parameters, and current within-mode parameter sets for each mode Z, are received. Then, in block 502, a log-likelihood L3 is set to negative infinity. Next, in block 503, expectation maximization is performed to generate evidence and weight sets for the current number of modes Z. A log-likelihood L4 is also calculated in block 503. Block 503 is discussed below in further detail with respect to FIGS. 6 and 7. Next, it is determined in block 504 if L3 is less than L4. If L3 is less than L4, flow proceeds from block 504 to block 505, in which L3 is set equal to L4. Then, in block 506, the current set of cross-mode and within-mode parameters are stored as an output parameter set. Flow then proceeds block 507, in which a set of cross-mode parameters are determined based on the evidence and weight sets that were determined in block 503; this is discussed below in further detail with respect to FIG. 8. Then, in block 508, the within-mode parameters for each mode Z are re-initialized, and flow returns to block 503. Blocks 503, and 504 to 508, are repeated until it is determined in block 504 that L3 is greater than L4, at which point flow proceeds from block 504 to block 509, and the output parameter set, include all cross-mode and within-mode parameters that were stored in the previous iteration of block 506, is returned. The output parameter set describes, for the current number of modes Z, the set of multivariate time series S with the highest log-likelihood.

Figure 6:
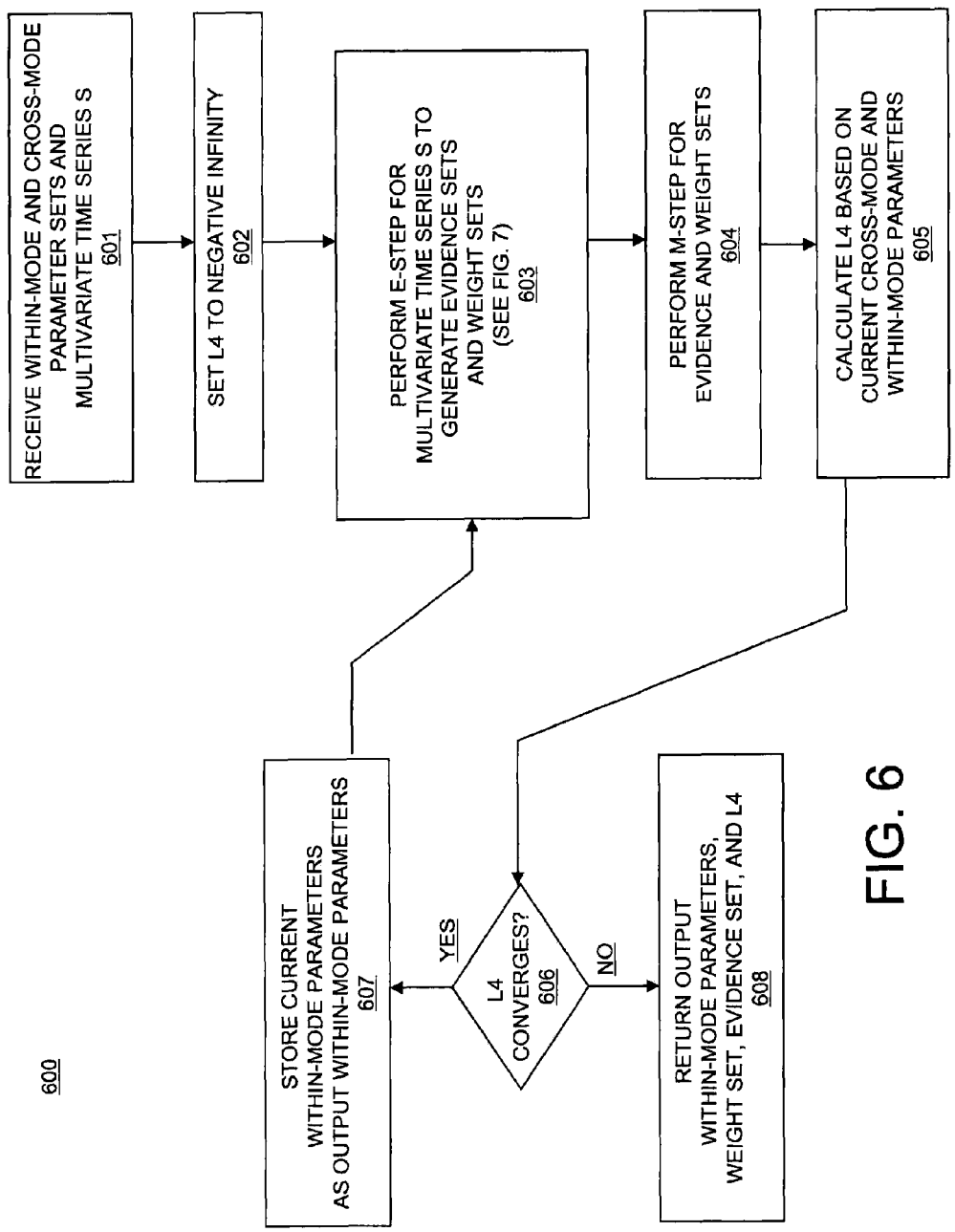
FIG. 6 depicts a process flow for generation of weight and evidence sets in accordance with an embodiment.

Referring to FIG. 6, a process flow of a method 600 for generation of weight and evidence sets in accordance with an embodiment is generally shown. Method 600 is performed in block 503 of FIG. 5. First, in block 601, the current within-mode and cross-mode parameter sets, and the set of multivariate time series S, are received. Next, in block 602, L4 is set to negative infinity. Then, in block 603, expectation maximization (E-step) is performed for the set of multivariate time series S to generate the evidence and weight sets; this is discussed in further detail with respect to FIG. 7. Flow then proceeds to block 604, in which a maximization step (M-step) is performed for the evidence and weight sets. Next, in block 605, log-likelihood L4 is calculated based on the current cross-mode and within-mode parameters. The equation for L4 is given by:

$$L4 = \log \Pi_i P(e_i^{\pi i}|\Theta_P) + \log \Pi_i \Pi_t P(x_t^i|x_{t-1}^i, z_t^i, A^{\pi i}, Q^{\pi i}) + \log \Pi_i \Pi_t P(y_t^i|x_t^i, z_t^i, H^{\pi i}, R^{\pi i}) \quad \text{(EQ. 6)}$$

It is then determined in block 606 whether L4 converges. If it is determined in block 606 that L4 converges, flow proceeds to block 607, in which the current within-mode parameters are stored as output parameters. Blocks 603 to 605, and 606 to 607, are repeated until it is determined in block 606 that L4 does not converge, at which point flow proceeds from block 605 to block 608, and the output parameter set, include the within-mode parameters that were stored in the iteration of block 607, is returned along with L4.

Figure 7:
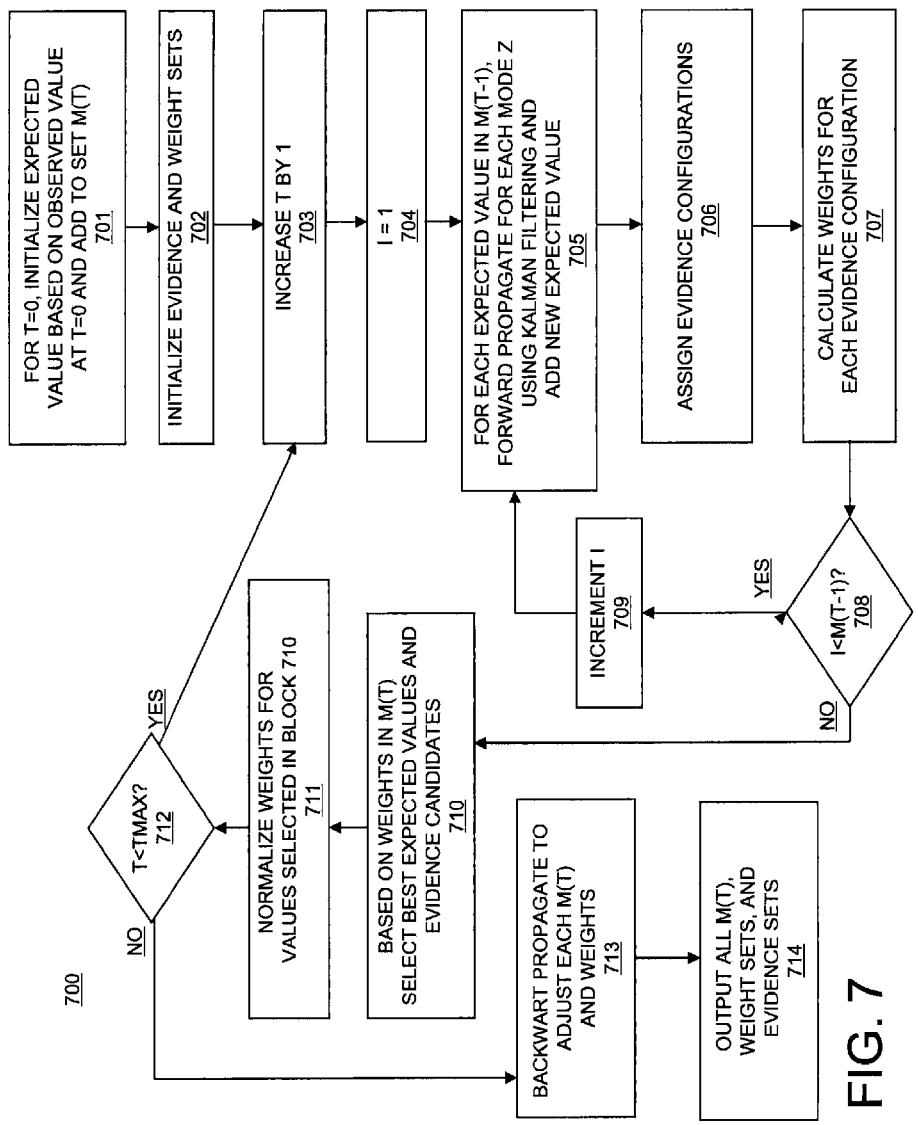
FIG. 7 depicts a process flow for expectation maximization (E-step) in accordance with an embodiment.

Turning now to FIG. 7, a process flow of a method 700 for E-step in accordance with an embodiment is generally shown. Method 700 is performed in block 603 of FIG. 6. First, in block 701, T is initialized to zero, and for a particular multivariate time series element of S, an expected value based on the observed value of that multivariate time series at T=0 is added to a set M(T). Next, in block 702, the evidence and weight sets are initialized to empty and 1, respectively. Then, in block 703, T is incremented by 1. Next, in block 704, I is set to 1. Next, in block 705, each expected value in M(T−1) is forward propagated for each mode Z in the multivariate time series according to Kalman filtering, and a new expected value based on the forward propagation is added to M(T). The expected value is forward propagated according to switching Kalman filtering by considering the probability of a switch to each mode Z in each time step T. Next, in block 706, for each expected value in M(T), an evidence configuration is assigned for each mode, tracking any mode switch at time T. If there are k different evidence configurations at time T, then in T+1, k|Z| evidence configurations will be generated based on the binary values and time values. Then, in block 707, weights are calculated for each evidence configuration that was determined in block. The weight for each evidence configuration is updated based on the observed value at T+1 and the probability of a switch to the corresponding mode at time T given the entire history of past mode changes. Probabilities for observed value at T+1 are evaluated according to the observation model of the correspondingly indexed LDS. For calculating probabilities of transitions to different modes given the entire history of previous mode changes, probabilistic event networks are used.

Next, in block 708, it is determined if I is less than the number of members in M(T−1). If I is less than the number of members in M(T−1), flow proceeds from block 708 to block 709, and I is incremented in block 709. Blocks 705-707 are repeated until I is equal to the number of members in M(T−1) in block 708, such that each member of M(T−1) has been forward propagated to M(T). At this point flow proceeds to block 710, in which best expected value and evidence candidates are selected from M(T) based on the weights; the k most probable evidence configurations are chosen. Then, in block 711, the weights for the evidence candidates selected in block 710 are normalized, and flow proceeds to block 712, in which it is determined if T is less than $T_{MAX}$ (i.e., the highest T in the multivariate time series). If T is less than $T_{MAX}$, flow proceeds from block 712 to block 703, in which T is incremented by 1. Blocks 704-709, and 710-711, are repeated until T is equal to $T_{MAX}$ in block 712, at which point flow proceeds from block 712 to block 713. In block 713, backward propagation is performed to adjust each M(T) and the associated weights. Backward propagating is performed through the multivariate time series according to Kalman filtering and the expected values for each state variable as well as the weights of the evidence configurations are updated. Lastly, in block 714, all M(T), weight sets, and evidence sets are output.

Figure 8:
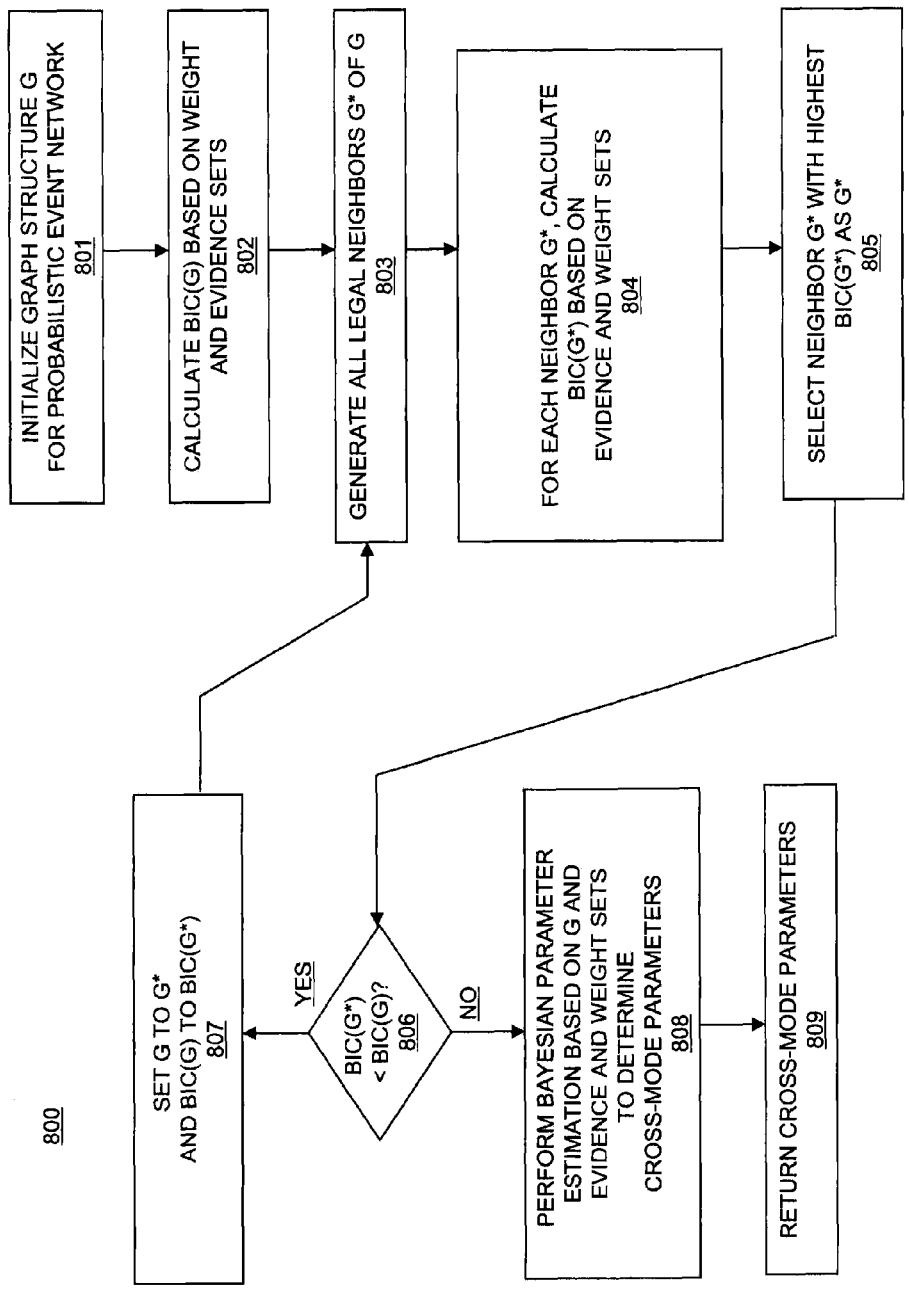
FIG. 8 depicts a process flow for learning of the cross-mode parameters in accordance with an embodiment.

Referring to FIG. 8, a process flow of a method 800 for learning of the cross-mode parameters in accordance with an embodiment is generally shown. Method 800 is performed in block 507 of FIG. 5. The cross-mode parameters are determined based on the evidence and weight sets. First, in block 801, a graph structure G is initialized for the probabilistic event network P. Next, in block 802, a Bayesian information criterion (BIC) is calculated for G (i.e., BIC(G)) based on the evidence and weight sets. Then, in block 803, all legal neighbors G* of G are created. Legal neighbors are graph structures comprising all structures that are in conformance with the semantics of the probabilistic event network P. In block 804, BIC(G*) is determined for all G* created in block 803 based on the evidence and weight sets. Next, in block 805, the neighbor G* having the highest BIC(G*) is selected. Then, flow proceeds to block 806, in which it is determined if BIC(G*) is less than BIC(G). If it is determined in block 806 that BIC(G*) is less than BIC(G), then flow proceeds from bock 806 to block 807, and G is set equal to G*, such that BIC(G*) is equal to BIC(G). Blocks 803-805, and 806-807, are then repeated until BIC(G*) is greater than or equal to BIC(G) in block 806 (i.e., no improvement is achieved), at which point flow proceeds from block 806 to block 808. In block 808, Bayesian parameter estimation is performed based on the current G and the evidence and weight sets to determine the cross-mode parameters. Lastly, in block 809, the cross-mode parameters are returned.

Figure 9:
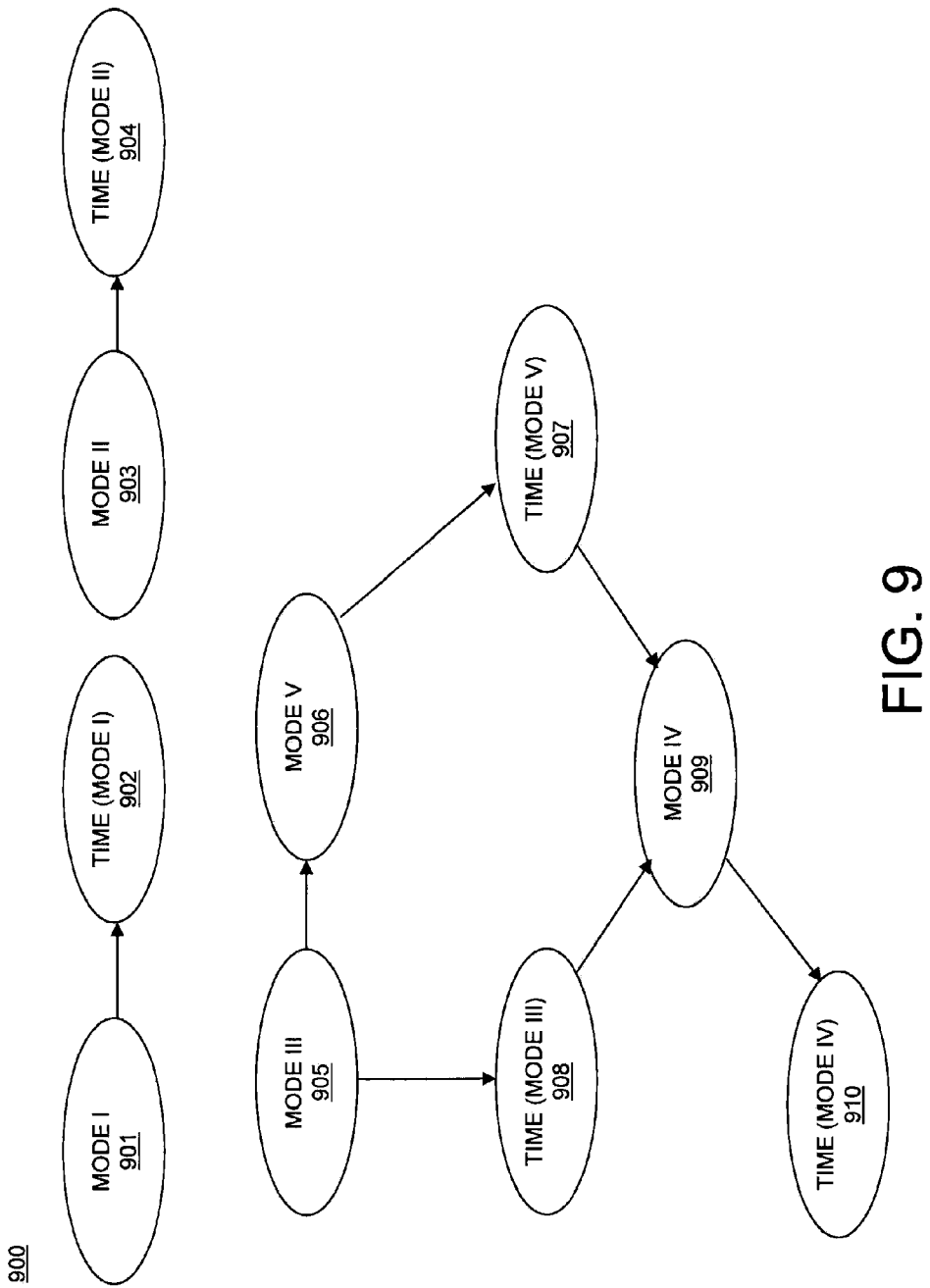
FIG. 9 depicts a graph structure for a plurality of for modes in a multivariate time series in accordance with an embodiment.

An exemplary graph structure of cross-mode parameters that may be generated by method 800 of FIG. 8 is illustrated in graph 900 in FIG. 9. As shown in FIG. 9, there is a relationship between the occurrence of mode III 905 and occurrence of mode V 906. The binary and time variables for each of nodes 901-910 are given in Tables 1-10.

TABLE 1

| Occurrence of Mode I (901) | |
| --- | --- |
| False | True |
| 0 | 1 |

TABLE 2

| Time of Mode I (902) | |
| --- | --- |
| Mode I | Time |
| False | Null |
| True | U(1, 4) |

TABLE 3

| Occurrence of Mode II (903) | |
| --- | --- |
| False | True |
| .1 | .9 |

TABLE 4

| Time of Mode II (904) | |
| --- | --- |
| Mode I | Time |
| False | Null |
| True | N(3, 5) |

TABLE 5

| Occurrence of Mode III (905) | |
| --- | --- |
| False | True |
| .3 | .7 |

TABLE 6

| Time of Mode III (908) | |
| --- | --- |
| Mode I | Time |
| False | Null |
| True | U(4, 7) |

TABLE 7

Occurrence of Mode IV (909)

| | |
|---|---|
| False | $1 - \left(.9 * \dfrac{1}{2\Pi} e^{-\frac{(Time(Mode\ V)-Time(Mode\ III)-2)^2}{2}}\right)$ |
| True | $.9 * \dfrac{1}{2\Pi} e^{-\frac{(Time(Mode\ V)-Time(Mode\ III)-2)^2}{2}}$ |

TABLE 8

Time of Mode IV (910)

| Mode I | Time |
|---|---|
| False | Null |
| True | U(10, 13) |

TABLE 9

Occurrence of Mode V (906)

| | Mode V | |
|---|---|---|
| Mode III | False | True |
| False | .3 | .7 |
| True | .5 | .5 |

TABLE 10

Time of Mode V (907)

| Mode I | Time |
|---|---|
| False | Null |
| True | N(6, 2) |

Figure 10:
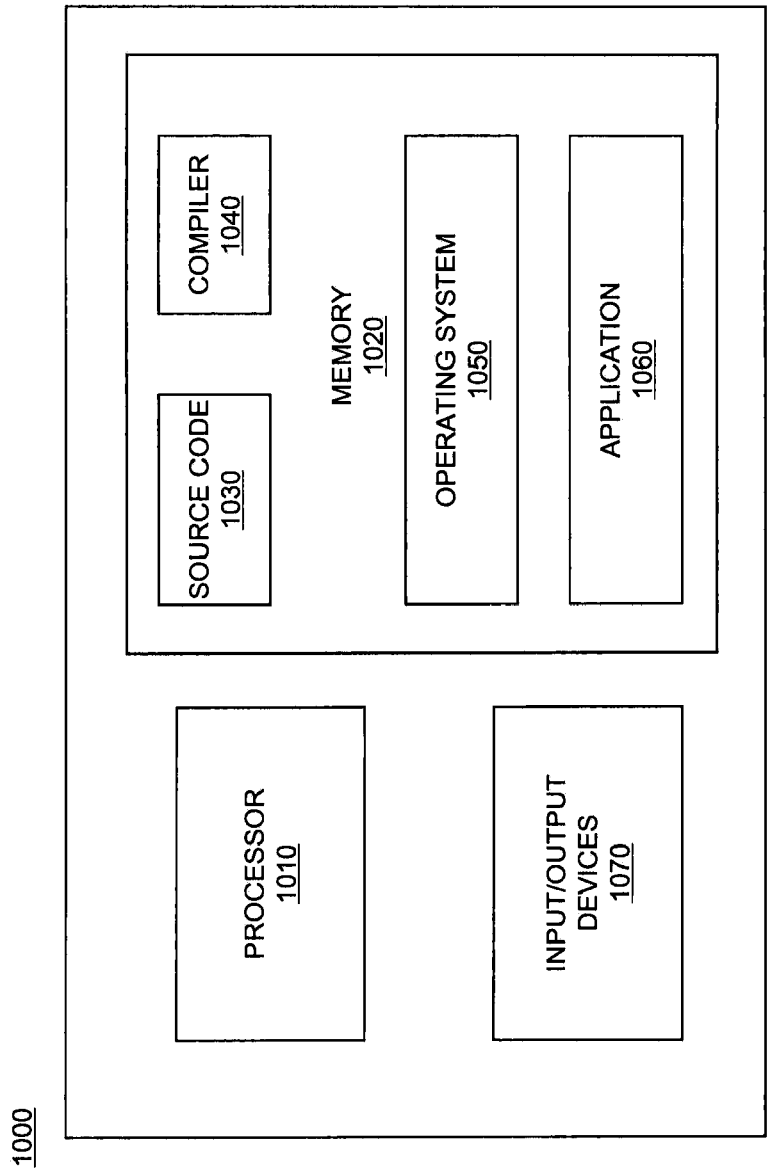
FIG. 10 depicts a computer that may be used in conjunction with embodiments of mode determination for multivariate time series data in accordance with an embodiment.

FIG. 10 illustrates an example of a computer 1000 which may be utilized by exemplary embodiments of mode determination for multivariate time series data. Various operations discussed above may utilize the capabilities of the computer 1000. One or more of the capabilities of the computer 1000 may be incorporated in any element, module, application, and/or component discussed herein.

The computer 1000 includes, but is not limited to, PCs, workstations, laptops, PDAs, palm devices, servers, storages, and the like. Generally, in terms of hardware architecture, the computer 1000 may include one or more processors 1010, memory 1020, and one or more I/O devices 1070 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 1010 is a hardware device for executing software that can be stored in the memory 1020. The processor 1010 can be virtually any custom made or commercially available processor, a central processing unit (CPU), a digital signal processor (DSP), or an auxiliary processor among several processors associated with the computer 1000, and the processor 1010 may be a semiconductor based microprocessor (in the form of a microchip) or a macroprocessor.

The memory 1020 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1020 may incorporate electronic, magnetic, optical, and/or other types of storage media. Note that the memory 1020 can have a distributed architecture, where various components are situated remote from one another, but can be accessed by the processor 1010.

The software in the memory 1020 may include one or more separate programs, each of which comprises an ordered listing of executable instructions for implementing logical functions. The software in the memory 1020 includes a suitable operating system (O/S) 1050, compiler 1040, source code 1030, and one or more applications 1060 in accordance with exemplary embodiments. As illustrated, the application 1060 comprises numerous functional components for implementing the features and operations of the exemplary embodiments. The application 1060 of the computer 1000 may represent various applications, computational units, logic, functional units, processes, operations, virtual entities, and/or modules in accordance with exemplary embodiments, but the application 1060 is not meant to be a limitation.

The operating system 1050 controls the execution of other computer programs, and provides scheduling, input-output control, file and data management, memory management, and communication control and related services. It is contemplated by the inventors that the application 1060 for implementing exemplary embodiments may be applicable on all commercially available operating systems.

Application 1060 may be a source program, executable program (object code), script, or any other entity comprising a set of instructions to be performed. When a source program, then the program is usually translated via a compiler (such as the compiler 1040), assembler, interpreter, or the like, which may or may not be included within the memory 1020, so as to operate properly in connection with the O/S 1050. Furthermore, the application 1060 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 1070 may include input devices such as, for example but not limited to, a mouse, keyboard, scanner, microphone, camera, etc. Furthermore, the I/O devices 1070 may also include output devices, for example but not limited to a printer, display, etc. Finally, the I/O devices 1070 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 1070 also include components for communicating over various networks, such as the Internet or intranet.

If the computer 1000 is a PC, workstation, intelligent device or the like, the software in the memory 1020 may further include a basic input output system (BIOS) (omitted for simplicity). The BIOS is a set of essential software routines that initialize and test hardware at startup, start the O/S 1050, and support the transfer of data among the hardware devices. The BIOS is stored in some type of read-only-memory, such as ROM, PROM, EPROM, EEPROM or the like, so that the BIOS can be executed when the computer 1000 is activated.

When the computer 1000 is in operation, the processor 1010 is configured to execute software stored within the memory 1020, to communicate data to and from the memory 1020, and to generally control operations of the computer 1000 pursuant to the software. The application 1060 and the O/S 1050 are read, in whole or in part, by the processor 1010, perhaps buffered within the processor 1010, and then executed.

When the application 1060 is implemented in software it should be noted that the application 1060 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 1060 can be embodied in any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any means that can store the program for use by or in connection with the instruction execution system, apparatus, or device. The computer readable storage medium can be, for example but not limited to, an electronic, magnetic, optical, electromagnetic, or semiconductor system, apparatus, or a device.

More specific examples (a nonexhaustive list) of the computer-readable storage medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable storage medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 1060 is implemented in hardware, the application 1060 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects and benefits include accurate modeling of multivariate time series data.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium (s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system comprising:
   a memory module, the memory module having computer readable computer instructions; and
   a processor for executing the computer readable instructions, the instructions including:
      receiving at least one multivariate time series comprising historical data;
      determining a first number of modes for the at least one multivariate time series, each mode comprising one or more time periods in the multivariate time series;
      for each mode of the first number of modes, determining first respective sets of within-mode parameters that describe behavior of the at least one multivariate time series during the one or more time periods corresponding to the mode;
      determining a first set of cross-mode parameters for the first number of modes that describe behavior of the at least one multivariate time series across the first number of modes;
      determining a first likelihood of the at least one multivariate time series based on the first sets of within-mode parameters and first set of cross-mode parameters;
      determining a second number of modes for the at least one multivariate time series;
      for each mode of the second number of modes, determining second respective sets of within-mode parameters that describe behavior of the at least one multivariate time series during the one or more time periods corresponding to the mode;
      determining a second set of cross-mode parameters for the second number of modes that describe behavior of the at least one multivariate time series across the second number of modes;
      determining a second likelihood of the at least one multivariate time series based on the second sets of within-mode parameters and second set of cross-mode parameters; and
      based on the first likelihood being higher than the second likelihood, selecting the first number of modes to model the at least one multivariate time series.

2. The system of claim 1, wherein the first and second sets of within-mode parameters comprise linear dynamic system parameters.

3. The system of claim 1, wherein the historical data comprises sensor data.

4. The system of claim 3, wherein the sensor data comprises data from one of a vibration sensor and a temperature sensor.

5. The system of claim 1, wherein the first and second set of cross-mode parameters are determined based on a probabilistic event network.

6. The system of claim 5, wherein the first and second set of cross-mode parameters comprise an occurrence value, the occurrence value comprising a binary variable, and a time value for each mode.

7. The system of claim 5, wherein the first and second set of cross-mode parameters are further determined based on determination of a Bayesian information criterion.

8. The system of claim 5, wherein the first and second cross-mode parameters are further determined based on an evidence set and a weight set that are determined for the at least one multivariate time series.

9. The system of claim 5, wherein the evidence set and the weight set determined based on Kalman filtering.

10. The system of claim 1, wherein the second number of modes comprises the first number of modes incremented by one.

11. A system for parameter determination for multivariate time series data, comprising:
- a memory module, the memory module having computer readable computer instructions; and
- a processor for executing the computer readable instructions, the instructions including:
- determining a set of cross-mode parameters for a first number of modes that describe behavior of at least one multivariate time series across respective time periods corresponding to the first number of modes, wherein the set of cross-mode parameters are determined based on a probabilistic event network, and further based on evidence and weight sets that are determined by Kalman filtering;
- determining a likelihood of the at least one multivariate time series based on sets of within-mode parameters corresponding to the first number of modes and the set of cross-mode parameters;
- based on the likelihood being lower than a likelihood for a second number of modes, the second number of modes being equal to the first number of modes minus 1, outputting sets of within-mode parameters and a set of cross-mode parameters corresponding to the second number of modes.

* * * * *